United States Patent [19]

Yamada

[11] Patent Number: 4,673,845

[45] Date of Patent: Jun. 16, 1987

[54] ELECTRONIC FLASH APPARATUS

[75] Inventor: Masanori Yamada, Kanagawa, Japan

[73] Assignee: Canon Kabushiki Kaisha, Japan

[21] Appl. No.: 753,794

[22] Filed: Jul. 8, 1985

Related U.S. Application Data

[63] Continuation of Ser. No. 517,342, Jul. 26, 1983, abandoned.

[30] Foreign Application Priority Data

Jul. 29, 1982 [JP] Japan ................................. 57-130392
Jul. 29, 1982 [JP] Japan ................................. 57-130393

[51] Int. Cl.$^4$ ............................................. H05B 37/00
[52] U.S. Cl. ................................ 315/241 P; 315/151; 315/155; 354/416
[58] Field of Search ..................... 315/241 P, 151, 155; 354/416

[56] References Cited

U.S. PATENT DOCUMENTS

| | | | |
|---|---|---|---|
| 3,374,395 | 3/1968 | Donkers | 315/155 |
| 3,509,422 | 4/1970 | Kilgore | 315/241 P |
| 3,585,442 | 6/1971 | Krusche | 315/151 |
| 4,023,188 | 5/1977 | Ueda et al. | 354/416 |
| 4,317,626 | 3/1982 | Coppa et al. | 315/241 P |
| 4,319,165 | 3/1982 | Kuraishi | 315/151 |
| 4,354,141 | 10/1982 | Takematsu | 315/155 |
| 4,360,764 | 11/1982 | Yagi | 315/323 |
| 4,384,238 | 5/1983 | Greenwald et al. | 315/241 P |

Primary Examiner—Harold Dixon
Attorney, Agent, or Firm—Toren, McGeady & Associates

[57] ABSTRACT

In an electronic flash apparatus which is provided with a first discharge tube for bounce illumination and a second flash discharge tube for direct illumination, emission of flash light by the first flash discharge tube and emission of flash light by the second are arranged to separately begin and to simultaneously end to simplify complex circuit arrangement otherwise required for having the amount of light reflected by the object of flash light emission by the first discharge tube and that of flash light emission by the second discharge tube in a fixed ratio. The second discharge tube is arranged to flash without fail despite of the simplified circuit arrangement.

14 Claims, 5 Drawing Figures

ELECTRONIC FLASH APPARATUS

This is a continuation of application Ser. No. 517,342, filed July 26, 1983 now abandoned.

BACKGROUND OF THE INVENTION

1. Field of the Invention

This invention relates to an improvement on an electronic flash apparatus of the automatic light control type having first and second flash discharge tubes.

2. Description of the Prior Art

In a photographing art called bounce photography, a flash light of an electronic flash device is arranged to be reflected by a ceiling or a wall for photographing illumination. However, in cases where an object to be photographed is, for example, a person or the like, it is sometimes hardly possible to obtain a lively picture due to a shade produced on the lower half of the face, disappearance of light from eyes, etc. To solve this problem, there have been proposed electronic flash devices of the kind having two flash discharge tubes, one for indirect bounce illumination and the other for direct front illumination.

An example of these prior art devices which has been disclosed by Japanese Utility Model Laid-Open Application No. Sho 55-164624 is arranged as shown in FIGS. 1 and 2 of the drawings annexed hereto. In the prior art device, a flash discharge tube 1 for bounce illumination, another flash discharge tube 2 for direct illumination and a thyristor 3 are connected in series. Another thyristor 4 or 5 is connected either in parallel with the flash discharge tube 2 or in parallel with the series circuit of the flash discharge tube 2 and the thyristor 3. The flash discharge tubes 1 and 2 are arranged to simultaneously begin to flash when the thyristor 3 is energized. When the quantity of light received reaches a first prescribed level which is of a relatively small value, the thyristor 4 or 5 is energized to stop the direct illuminating flash discharge tube 2 from flashing. Then, when the received light quantity reaches a second prescribed level which is set at a value required for an appropriate exposure, the thyristor 3 or 5 becomes nonconductive to stop the bounce illuminating flash discharge tube 1 from flashing.

The electronic flash device of this kind necessitates use of a plurality of switching elements for controlling flashing currents, as indicated by the thyristors 3 and 4 in FIG. 1 and by thyristors 3 and 5 in FIG. 2. This arrangement of the prior art thus has resulted in a complex circuit.

SUMMARY OF THE INVENTION

It is an object of the present invention to provide an electronic flash apparatus which permits circuit simplification to solve the above stated problem of the prior art and which allows a first flash discharge tube to flash without fail.

It is another object of the invention to provide an electronic flash apparatus which allows a second falsh discharge tube to flash without fail even when the voltage of a capacitor accumulating a flash discharge energy comes to drop during flashing by a first flash discharge tube.

These and further objects and features of the invention will become apparent from the following detailed description of preferred embodiments thereof taken in connection with the accompanying drawings.

DETAILED DESCRIPTION OF THE PREFERRED EMBODIMENTS

Figure 1:
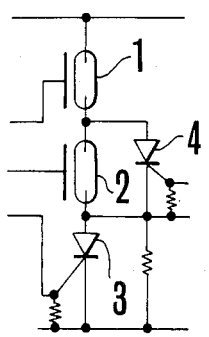
FIG. 1 is a circuit diagram showing by way of example the essential parts of a two-light type electronic flash device of the prior art.
Figure 2:
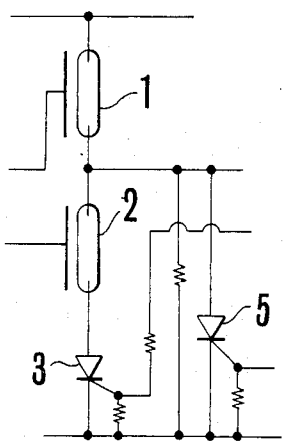
FIG. 2 is a circuit diagram showing as another example the essential parts of a two-light type electronic flash device of the prior art.
Figure 3:
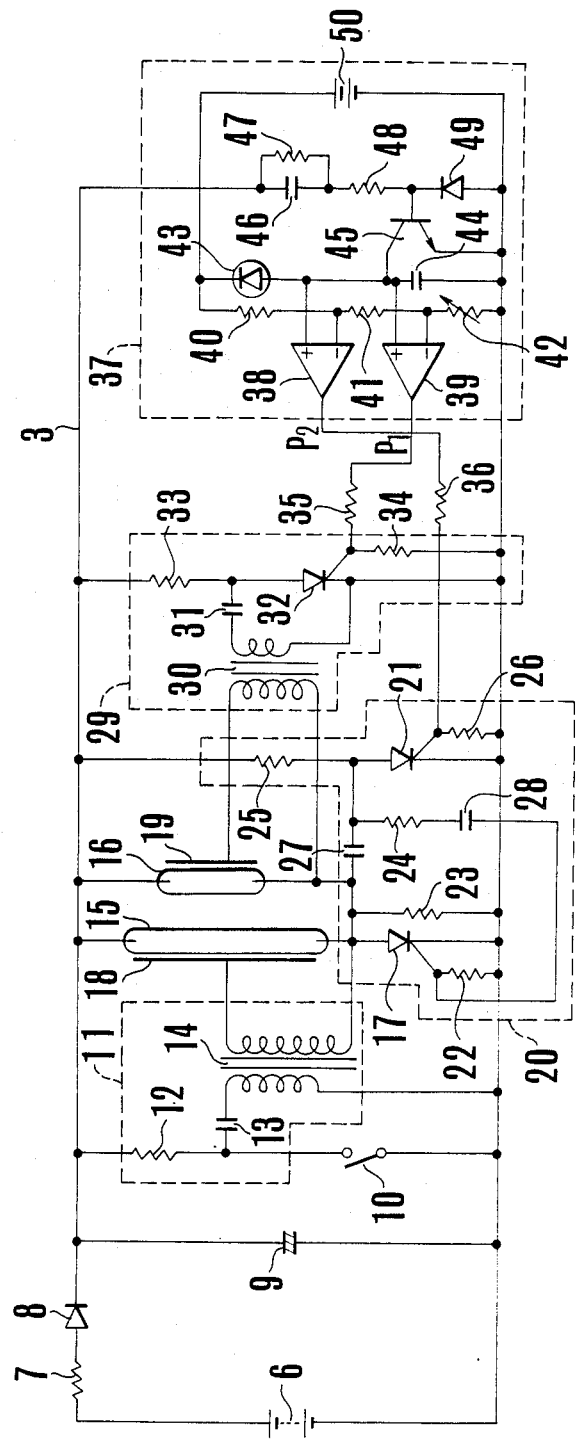
FIG. 3 is a circuit diagram showing a first embodiment example of the present invention.

FIG. 3 shows an electronic flash apparatus of a series light control type as an embodiment of the present invention. The embodiment comprises a high voltage power source 6; a resistor 7; a diode 8; a main capacitor 9; a synchronizing contact 10; and a first trigger circuit 11 which consists of a resistor 12, a trigger capacitor 13 and a trigger transformer 14. A first flash discharge tube 15 for bounce illumination and a second flash discharge tube 16 for direct illumination are connected in parallel to each other and are then connected in series to a main thyristor 17. The embodiment further includes trigger electrodes 18 and 19; a light quantity control circuit 20 which consists of the main thyristor 17, an auxiliary thyristor 21, resistors 22 and 26, a commutation capacitor 27 and a capacitor 28; a second trigger circuit which consists of a trigger transformer 30, a trigger capacitor 31, a thyristor 32 and resistors 33 and 34; resistors 35 and 36; and a light measuring circuit 37 which consists of comparators 38 and 39, voltage dividing resistors 40-42, a photo diode 43, an integrating capacitor 44, a transistor 45, a capacitor 46, resistors 47 and 48, a diode 49 and a local power source 50. The embodiment operates as follows:

The main capacitor 9 is charged by the high voltage power source 6 through the resistor 7 and the diode 8. With the main capacitor 9 sufficiently charged, when the synchronizing contact 10 is closed under that condition, the trigger circuit 11 triggers the first flash discharge tube 15. The inside of the discharge tube 15 is ionized. A current resulting from this ionization is supplied via the commutation capacitor 27, the resistor 24 and the capacitor 28 to the gate of the main thyristor 17 to energize the thyristor. This causes the electric charge of the main capacitor 9 to be discharged via the first flash discharge tube 15 and a main thyristor 17. The discharge tube 15 begins to flash.

The resistor 47 is of a high resistance value and the resistor 48 of a relatively low resistance value. Therefore, the capacitor 46 is charged with the voltage of the main capacitor 9 before commencement of flashing by the discharge tube 15. The transistor 45 is receiving a base current via the resistors 47 and 48 and thus has been turned on to prevent the integrating capacitor 44 from being charged. With the flash discharge tube 15 having begun to flash, the electric charge of the capacitor 46 flows to a closed circuit consisting of the flash discharge tube 15, the main thyristor 17, the diode 49 and the resistor 48. As a result of that, the region between the base and the emitter of the transistor 45 is reversely biased to turn the transistor 45 off. This brings the integrating capacitor 44 into a chargeable state.

A reflection light which comes from an object to be photographed as a result of flashing of the flash discharge tube 15 is received by the photo diode 43. Then, a voltage corresponding to the quantity of the reflection light received by the photo diode develops at the integrating capacitor 44. The potential of a voltage dividing point between the voltage dividing resistors 41 and 42 is set at a value corresponding to a first prescribed level of received light quantity which is relatively high. Meanwhile, the potential of a voltage dividing point between the voltage dividing resistors 40 and 41 is set at a value corresponding to a second prescribed level which is a light quantity required for an appropriate exposure. Such being the arrangement, the voltage of the integrating capacitor 44 exceeds the potential of the voltage dividing point between the resistors 41 and 42 when the quantity of the received light reaches the first prescribed level. Then, the comparator 39 produces a flashing instruction signal P1 of a high level. This causes the trigger circuit 29 to trigger flashing by the second flash discharge tube 16. When the received light quantity further increases to reach the second prescribed level, the comparator 38 produces a flash stopping instruction signal P2 of a high level. This signal renders the auxiliary thyristor 21 conductive. Then, the commutation capacitor 27 works to render the main thyristor 17 nonconductive. Both the flash discharge tubes 15 and 16 thus cease to flash.

The first flash discharge tube 15 is provided for indirectly illuminating an object to be photographed by utilizing the reflection of its light by a wall or the like. The second flash discharge tube 16 is provided for the purpose of directly illuminating the object with its light. Accordingly, the direct light is measured within a range up to the first prescribed level of the received light quantity. The indirect light and the direct light are measured within a range from the first prescribed level up to the second prescribed level. However, since the reflection light from the indirect light is much lower than the reflection light resulting from the direct light, the period of time required for reaching the first prescribed level is relatively long. Meanwhile, a period of time required for reaching the second level is by far shorter than the time required for the first. Accordingly, it is virtually only the direct illumination light that is measured during the measuring period between the first level and the second level. Therefore, the ratio of the indirect illumination light quantity to the direct illumination light quantity becomes unvarying irrespectively of the distance to the object to be photographed.

Further, if a voltage for maintaining flash light emission by the flash discharge tube 16 is set at a value sufficiently lower than a voltage for maintaining flash light emission by the flash discharge tube 15, the discharge tube 15 ceases to flash when the discharge tube 16 begins to flash. With such arrangement employed, the direct light can be measured absolutely alone within the range from the first level to the second.

In the specific embodiment shown in FIG. 3, the main thyristor 17 is employed as the switching element according to the present invention. However, in accordance with the invention, the thyristor 17 may be replaced with some other suitable element such as a bidirectional thyristor or transistor.

The invention is applicable not only to a series light control system as shown in FIG. 3 but also to a parallel light control system. In the latter case, the switching element is connected in parallel to the flash discharge tubes 15 and 16; and these discharge tubes are arranged to be stopped from flashing by energizing the switching element. Further, in this particular embodiment example, the first prescribed level of received light quantity is arranged to be unvarying. However, for photographing to be accomplished by varying the ratio of the reflected illumination light to the direct illumination light, the first prescribed level may be arranged to be variable.

Figure 4:
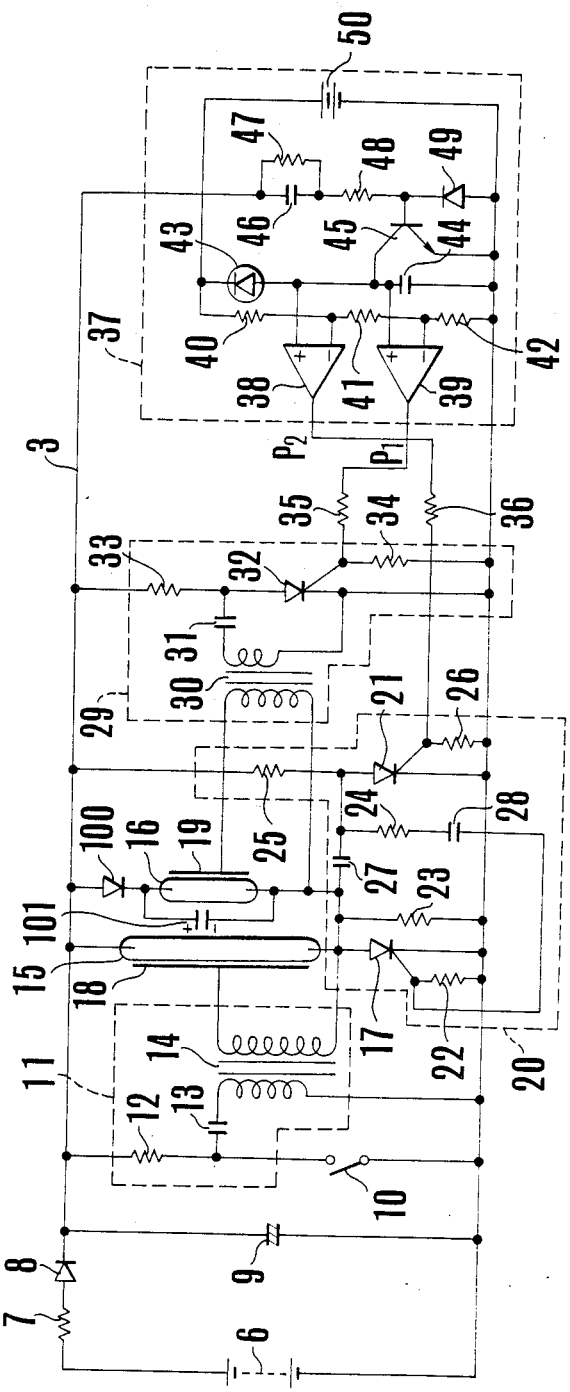
FIG. 4 is a circuit diagram showing a second embodiment example of the invention in which a second discharge tube 16 of the first embodiment example is arranged to flash without fail.

A second embodiment example of the invention is arranged as shown in a circuit diagram by FIG. 4, in which: The elements of the embodiment operating in the same manner as those of the preceding embodiment example shown in FIG. 3 are indicated by the same reference numerals. These elements will be omitted from the following description. Referring to FIG. 4, the second embodiment is provided with a diode 100 which is connected between the anode of a diode 8 and a connection point between the flash discharge tube 16 and a capacitor 101. The capacitor 101 is of a sufficiently small capacity and is provided for the purpose of holding an interpolar voltage. The second embodiment which is arranged in this manner operates as follows:

The main capacitor 9 is charged by the high voltage source 6 through the resistor 7 and the diode 8. The interpolar voltage holding capacitor 101 is charged through the diode 100 to a voltage which is about the same as the charge voltage of the main capacitor 9. When the synchronizing contact 10 is closed with the capacitors sufficiently charged, the first flash discharge tube 15 is triggered by the trigger circuit and begins to flash. The ensuing operation is carried out in the same manner as in the prededing embodiment. Then, the second flash discharge tube 16 is also triggered to begin to flash. When the first flash discharge tube 15 begins to flash, the voltage of the interpolar voltage holding capacitor 101 is prevented by the diode 100 from being discharged. As a result of that, the interpolar voltage of the second flash discharge tube 16 is kept at the voltage of the interpolar voltage holding capacitor 101. This arrangement ensures that the flash discharge tube 16 performs flashing without fail. Besides, the capacity of the interpolar voltage holding capacitor 101 can be set at a sufficiently small value to almost completely preclude an adverse effect on an exposure.

Figure 5:
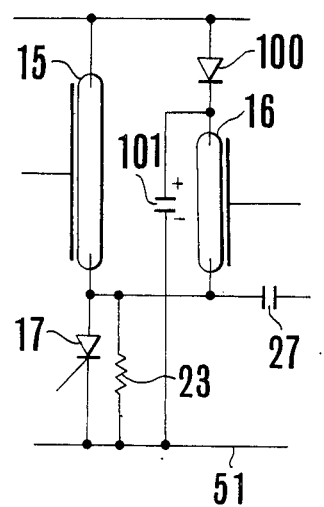
FIG. 5 is a circuit diagram showing the essential parts of a third embodiment example of the invention.

Referring now to FIG. 5, the above stated interpolar voltage holding capacitor 101 does not have to be parallel connected to a second flash discharge tube 16 but may be arranged, as shown in FIG. 5, to have its positive charge terminal connected to a connection point between a diode 100 and the flash discharge tube 16 and its negative charge terminal connected to a grounding line 51.

In the above embodiment, the flash discharge tube for the direct light is illuminated after the flash discharge tube for bouncing has been illuminated. However, needless to say, the flash discharge tube for bouncing may be first illuminated.

What I claim:
1. An electronic flash apparatus comprising:
   (a) capacitor means for accumulating flash energy;
   (b) first flash emitting means for emitting an indirect illumination light;
   (c) second flash emitting means for emitting a direct illumination light, said second flash emitting means being connected in parallel to said first flash emitting means;

(d) common switching means connected in series to a parallel circuit including said first and second falsh emitting means; and (e) control means for controlling said second flash emitting means and for varying the condition of said switching means, said control means producing a first signal for causing the second flash emitting means to flash when light reflected by an object and emerging from said first flash emitting means reaches a first level, and producing a second signal to render the common switching means inoperative so as to extinguish the illuminating light of the first and second flash emitting means when light reflected by the object and emerging from said first and second flash emitting means reaches a second level.

2. An electronic flash apparatus comprising:

(a) capacitor means for accumulating a flashing energy;

(b) first flash emitting means for emitting an indirect illumination light;

(c) second flash emitting means for emitting a direct illuminating light, said second flash emitting means being connected in parallel to said first flash emitting means;

(d) switching means connected in series to a parallel circuit consisting of said capacitor means and said first and second flash emitting means; and (e) control means for controlling said second flash emitting means and for varying the condition of said switching means, said control means being arranged such that said control means produces a first signal for causing the second flash emitting means to flash when a reflection light resulting from flash light emission by said first flash emitting means reaches a first level and produces a second signal for extinguishing the arcs of the first and second flash emitting means when the reflection light reaches a second level;

said control means including:

(1) light receiving means for receiving a reflection light coming from an object to be photographed;

(2) a capacitor which accumulates a signal produces from said light receiving means;

(3) a first reference signal source arranged to produce a first reference signal of a first prescribed level;

(4) a second reference signal source arranged to produce a second reference signal of a second prescribed level;

(5) a first comparator which compares the voltage of said capacitor with the voltage of said first reference signal source, said first comparator being arranged to drive said switching means to cause said second flash emitting means to flash when the voltage of said capacitor exceeds the voltage of said first reference signal source; and (6) a second comparator which compares the voltage of said capacitor with the voltage of said second reference signal source, said second comparator being arranged to drive said switching means to cause said first and second flash emitting means to cease to flash when the voltage of said capacitor exceeds the voltage of said second reference signal source.

3. An electronic flash apparatus according to claim 1 or 2, wherein a flash light emission maintaining voltage for said second flash emitting means is sufficiently lower than a flash light emission maintaining voltage for the first flash emitting means.

4. An electronic flash apparatus according to claim 1, further including means for varying said first level.

5. An electronic flash apparatus according to claim 2, further including means for varying the output of said first reference signal source.

6. An electronic flash apparatus according to claim 2, wherein said first reference signal source includes a power source and voltage dividing resistors.

7. An electronic flash apparatus according to claim 2, wherein said second reference signal source includes a power source and voltage dividing resistors.

8. An electronic flash apparatus comprising:

(a) capacitor means for accumulating flash energy;

(b) first flash emitting means for emitting an indirect illumination light;

(c) second flash emitting means for emitting a direct illumination light, said second flash emitting means being connected in parallel to said first flash emitting means;

(d) common switching means connected in series to a parallel circuit including said first and second flash emitting means;

(e) control means for controlling said second flash emitting means and for varying the condition of said switching means, said control means producing a first signal for causing the second flash emitting means to flash when light reflected by an object and emerging from said first flash emitting means reaches a first level, and producing a second signal extinguishing the illuminating light of the first and second flash emitting means when light reflected by the object and emerging from said first and second flash emitting means reaches a second level;

(f) a unidirectional conductive element connected in series to said second flash emitting means disposed in a parallel circuit including the first flash emitting means and the second flash emitting means; and (g) a capacitor inserted between a connection point of said unidirectional conductive element and the second flash emitting means and one terminal of the second flash emitting means not connected with said unidirectional conductive element.

9. An electronic flash apparatus according to claim 8, wherein a flash light emission maintaining voltage for said second flash emitting means is sufficiently lower than a flash light emission maintaining voltage for said first flash emitting means.

10. An electronic flash apparatus comprising:

(a) first flash emitting means for illuminating an object to be photographed with a flash of light, said first emitting means emitting a flash of light when electric current passes through a discharge path for the first flash emitting means;

(b) second flash emitting means for illuminating the object with a flash of light, said second emitting means emitting a flash of light when electric current passes through a discharge path for the second flash emitting means;

(c) common switching means for controlling the illumination of said first and second flash emitting means, said switching means being connected to a discharge path common to said first and second flash emitting means; and (d) control means for controlling said second flash emitting means and for varying the condition of said switching means, said control means producing a first signal for causing the second flash emitting means to flash when the amount of light reflected from the object resulting from flash light emission by said first flash emitting means reaches a first level, and producing a second signal to render the common switching means inoperative so as to extinguish the illumination of the first and second flash emitting means when the amount of light reflected from the object and resulting from said first and second flash emitting means reaches a second level.

11. An electronic flash apparatus comprising:
(a) first flash emitting means for illuminating an object with an indirect light;
(b) second flash emitting means for illuminating the object with a direct light;
(c) common switching means for controlling the illumination of said first and second flash emitting means said switching means being connected to a discharge path common to said first and second flash emitting means; and
(d) control means for controlling said second flash emitting means and for varying the condition of said switching means, said control means producing the first signal for causing the second flash emitting means to flash when a reflection light amount from the object resulting from flash light emission by said first flash emitting means reaches a first level, and producing a second signal to render the common switching means inoperative so as to extinguish the illumination of the first and second flash emitting means when the reflection light amount from the object and resulting from said frist and second flash emitting means reaches a second level.

12. An electronic flash apparatus comprising:
(a) capacitor means for accumulating a flashing energy;
(b) first flash emitting means for emitting an indirect illumination light;
(c) second flash emitting means for emitting a direction illumination light, said second flash emitting means being connected in parallel to said first flash emitting means;
(d) common switching means connected in series to a parallel circuit consisting of said first and second flash emitting means; and
(e) control means for controlling said second flash emitting means and for varying the condition of said switching means, said control means producing a first signal for causing the second flash emitting means to flash when reflected light resulting from flash light emission by said first flash emitting means reaches a first level, and producing a second signal to render the common switching means inoperative so as to extinguish the arcs of the first and second flash emitting means when the reflection light reaches a second level;
said control means including light measuring means which measures and integrates reflected light coming from an object to be photographed; driving means for causing said light measuring means to operate after commencement of flash light emission by said first flash emitting means; detector means for producing a first signal when the output of said light measuring means reaches the first level and a second signal when the output of the light measuring means reaches the second level; trigger means for causing said second flash emitting means to flash in response to the first signal of said detector means; and means for varying the condition of said switching means in response to the second signal of said detector means.

13. An electronic flash apparatus comprising:
(a) first flash emitting means for emitting an indirect illumination light;
(b) second flash emitting means for emitting a direct illumination light, said second flash emitting means being connected in parallel to said first flash emitting means;
(c) capacitor means connected to said first and second flash emitting means for accumulating a flash energy;
(d) switching means connected in series to a parallel circuit consisting of said first and second flash emitting means;
(e) control means of rcontrolling said second flash emitting means and for varying the condition of said switching means, said control means being arranged such that said control means produces a first signal for causing the second flash emitting means to flash when a reflection light resulting from flash light emission by said first flash emitting means reaches a first level and produces a second signal for extinguishing the arcs of the first and secnd flash emitting means when the reflection light reaches a second level; and
(f) said control means including light measuring means which measures and integrates a reflection light coming from an object to be photographed; driving means which causes said light measuring means to operate in response to triggering of said first flash emitting means; detector means which produces a first signal when the output of said light measuring means reaches the first level and a second signal when the output of the light measuring means reaches the second level; trigger means which causes said second flash emitting means to flash in response to the first signal of said detector means; and means for varying the condition of said switching means in response to the second signal of said detector means.

14. An electronic flash apparatus comprising:
(a) first flash emitting means for emitting an indirect illumination light;
(b) second flash emitting means for emitting a direct illumination light, said second flash emitting means being connected in parallel to said first flash emitting means;
(c) capacitor means connected to said first and second flash emitting means for accumulating a flash energy; and
(d) switching means connected in series to a parallel circuit consisting of said first and second flash emitting means; and
(e) control means for controlling said second flash emitting means and for varying the condition of said switching means, said control means being arranged such that said control means produces a first signal for causing the second flash emitting means to flash when a reflection light resulting from flash light emission by said first flash emitting means reaches a first level and produces a second signal for extinguishing the arcs of the first and second flash emitting means when the reflection light reaches a second level;

said control means including:
- (1) light receiving means for receiving a reflection light coming from an object to be photographed;
- (2) a capacitor which accumulates a signal produced from said light receiving means;
- (3) a first reference signal source arranged to produce a first reference signal of a first prescribed level;
- (4) a second reference signal source arranged to produce a second reference signal of a second prescribed level;
- (5) trigger means for causing said second flash emitting means to flash;
- (6) a first comparator for comparing the voltage of said capacitor with the voltage of said first reference signal source, said first comparator being arranged to drive said trigger means to cause said second flash emitting means to flash when the voltage of said capacitor exceeds the voltage of said first reference signal source; and
- (7) a second comparator for comparing the voltage of said capacitor with the voltage of said second reference signal source, said second comparator being arranged to drive said switching means to cause said first and second flash emitting means to cease to flash when the voltage of said capacitor exceeds the voltage of said second reference signal source.

* * * * *